(12) United States Patent
Shemer et al.

(10) Patent No.: US 9,182,051 B2
(45) Date of Patent: Nov. 10, 2015

(54) GAS SAVER VALVE AND METHOD USING THE SAME

(71) Applicants: Moshe Shemer, Evanston, IL (US); Bernard Azrikam, Niles, IL (US)

(72) Inventors: Moshe Shemer, Evanston, IL (US); Bernard Azrikam, Niles, IL (US)

( * ) Notice: Subject to any disclaimer, the term of this patent is extended or adjusted under 35 U.S.C. 154(b) by 223 days.

(21) Appl. No.: 13/949,091

(22) Filed: Jul. 23, 2013

(65) Prior Publication Data
US 2015/0027544 A1 Jan. 29, 2015

(51) Int. Cl.
*F16K 37/00* (2006.01)
*F16K 5/06* (2006.01)
*F16K 31/60* (2006.01)

(52) U.S. Cl.
CPC ........... *F16K 37/0016* (2013.01); *F16K 5/06* (2013.01); *F16K 5/0647* (2013.01); *F16K 31/60* (2013.01); *Y10T 137/0318* (2015.04); *Y10T 137/8275* (2015.04)

(58) Field of Classification Search
CPC ... F16K 31/60; F16K 31/602; F16K 37/0008; F16K 5/06; F16K 5/0647; Y10T 137/8275; Y10T 137/0318; Y10T 37/0016
USPC ............ 251/304, 315.01, 284–288; 137/544, 137/553, 556, 557
See application file for complete search history.

(56) References Cited

U.S. PATENT DOCUMENTS

| | | | |
|---|---|---|---|
| 1,028,132 A * | 6/1912 | Parker | 137/114 |
| 1,174,915 A * | 3/1916 | Walsh | 137/556 |
| 1,934,987 A | 11/1933 | Masters | |
| 2,747,876 A * | 5/1956 | Teller | 473/585 |
| 3,192,945 A * | 7/1965 | Blakeley | 137/375 |
| 3,624,627 A * | 11/1971 | Evans | 137/557 |
| 4,904,418 A | 2/1990 | Ziesel et al. | |
| 5,137,052 A | 8/1992 | Baumgart | |
| 5,392,825 A | 2/1995 | Mims et al. | |
| 6,345,768 B1 | 2/2002 | Inagaki et al. | |

(Continued)

FOREIGN PATENT DOCUMENTS

| | | |
|---|---|---|
| CN | 2491706 Y | 5/2002 |
| CN | 101862497 A * | 10/2010 |
| CN | 202392151 U | 8/2012 |

OTHER PUBLICATIONS

Victaulic Company, Vic®-300 MasterSeal Butterfly Valves, 2008, static.victaulic.com/assets/uploads/literature/I-VIC300MS.pdf, 40 pages.

(Continued)

*Primary Examiner* — John K Fristoe, Jr.
*Assistant Examiner* — Josephine Trinidad-Borges
(74) *Attorney, Agent, or Firm* — Richard C. Litman (57) ABSTRACT

Gas saver valves and methods for gaseous fluid pressure regulation are provided. The gas saver valve has a valve body and a regulator within the valve body for adjusting pressure of a gaseous fluid flowing through the valve body. A control member attached to the regulator allows for the adjustment of the regulator to selectively control the gas pressure of the flowing gaseous fluid. The control member is calibrated with a plurality of marked settings each of which corresponds to a value of gas pressure. The marked settings include a range of gas pressure values that are less than a reference gas pressure for the operation of a heat generating device. The reference gas pressure and the range of gas pressure generate a temperature in an operational range of the heat generating device. An indicator indicates a selected gas pressure when the indicator corresponds to a selected marked setting.

5 Claims, 7 Drawing Sheets

(56) References Cited

U.S. PATENT DOCUMENTS

| | | |
|---|---|---|
| 6,793,199 B2 | 9/2004 | Bushik et al. |
| 7,040,320 B2 | 5/2006 | Fjeld et al. |
| 7,575,710 B2 | 8/2009 | Bissonnette |
| 8,092,212 B2 | 1/2012 | Albizuri |
| 2004/0238029 A1* | 12/2004 | Haddad .......................... 137/66 |
| 2009/0090310 A1 | 4/2009 | Farrell |
| 2012/0032101 A1* | 2/2012 | Chen et al. ................... 251/337 |
| 2012/0091377 A1 | 4/2012 | Tips |
| 2012/0161053 A1* | 6/2012 | Wang ....................... 251/315.01 |

OTHER PUBLICATIONS

Homewerks Worldwide ¾-in.×¾-in. Brass FPT×FPT 1-Piece Lever-Handle Gas Valve, The Home Depot, homedepot.com/p/Homewerks-Worldwide-3-4-in-x-3-4-in-Brass-FPT-X-FPT-1-Piece-Lever-Handle-Gas-Valve-VGV1LHB4B/202369986?N=bqlw#.UUoC1RzCaSp *, 2 pages, Jul. 2, 2013.

* cited by examiner

GAS SAVER VALVE AND METHOD USING THE SAME

BACKGROUND OF THE INVENTION

1. Field of the Invention

The present invention relates to pressure regulation, and particularly to a gas saver valve for tapering gas pressure to calibrated values.

2. Description of the Related Art

Heat is an essential requirement in our daily lives. Cooking, cleaning, bathing, and space heating are just a few examples of daily heating applications. Many of these applications rely on gas heat generating devices, such as clothes dryers, furnaces, stoves, and water heaters, to produce the required heat. These heat generating devices generally employ the same basic set up with a lit pilot light near a gas supply line outlet. When gaseous fluid is expelled from the outlet the pilot light flame ignites the fluid into the burner which produces the flames that generate heat.

Figure 5:
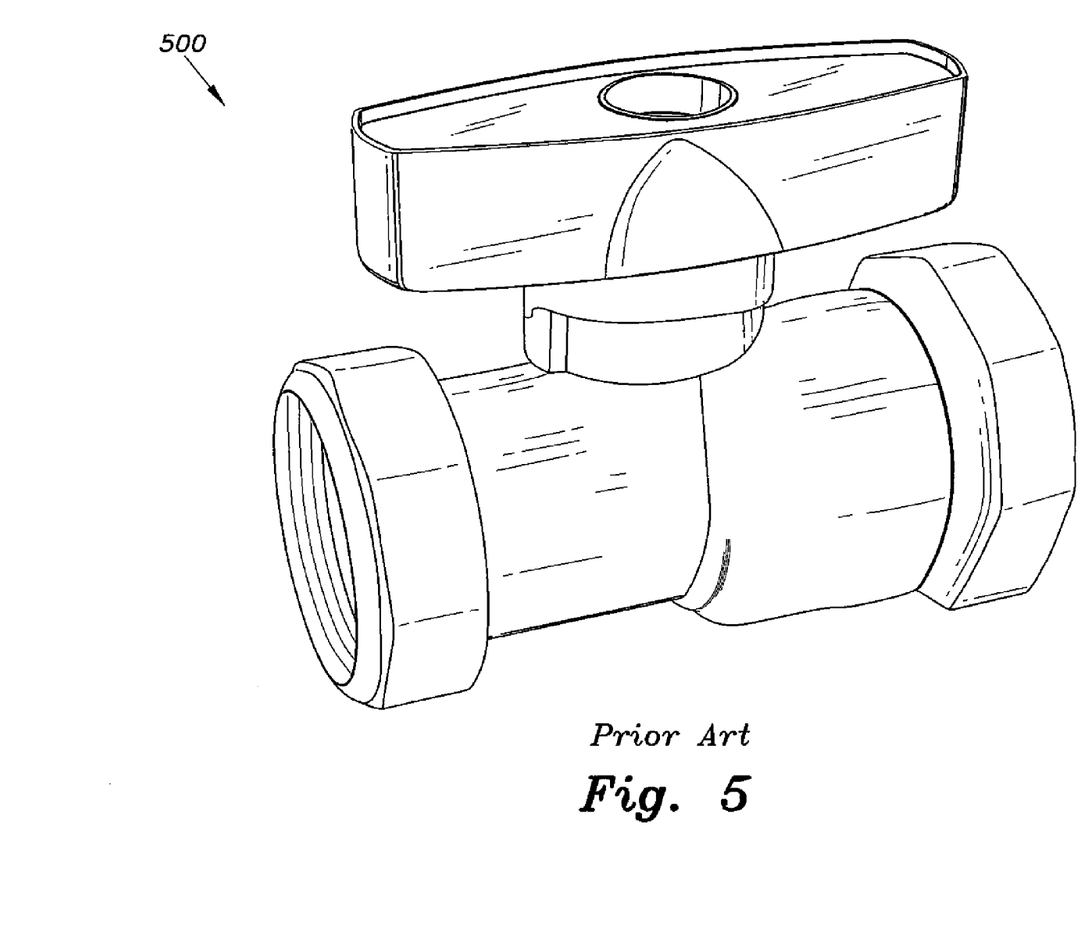
FIG. 5 is a perspective view of a prior art gas valve.

A gas supply line transports gaseous fluid to a heat generating device. The gaseous fluid can arrive from a utility company and into a dwelling, generally at a pressure of about 0.5 Pounds per Square Inch (Psi), which is a substantial relative amount of gas pressure. From the gas supply and into the heat generating device, the gaseous fluid flows at a pressure of about 3.75 to 3.5 inches of Water Column (inch WC). Present valves used to distribute gas from a gas supply do not adjust or regulate the pressure; the pressure stays at about 3.5 to 3.75 inch WC. Present valves simply carry and dispense the gaseous fluid at this substantial pressure of about 3.5 to 3.75 inch WC. Referring to FIG. 5, an example of a known gas valve 500 is shown. The gas valve 500 does not adjust the pressure of the gaseous fluid to a selected calibrated value of gas pressure in a range of gas pressure to operate a heat generating device, nor does the gas valve 500 have an indicator to allow the user to visualize the orientation of the ball valve and ensure that the gas pressure intended by the user is achieved.

There are many disadvantages for having gaseous fluid flow into the heat generating device out from the supply at such a substantial pressure. When gas flows into the heat generating device at a pressure of 3.5 to 3.75 inch WC, a large portion of the dispensed gas may be wasted. As an example involving a water heater, a regular water heater has a control valve that is set up to accommodate up to 4.0 inch WC of gas pressure for the incoming gaseous fluid. By having the gas enter the water heater at a pressure of about 3.5 to 3.75 inch WC, the chamber temperature within the water heater once the burner is active rises to 556 degrees Fahrenheit (° F.). Most manufacturers recommend that the temperature setting on the thermostat for the water should be set between 120 to 140° F. Therefore, when the gas pressure is about 3.5 to 3.75 inch WC, a temperature of 556° F. is generated to warm water to only between 120 to 140° F. The remaining high level of temperature and gaseous fluid that is not used is disposed through a diverter and vented out through the water tank stack pipe. Therefore, a large portion of the gaseous fluid can be wasted since a greater amount is used than what is necessary.

Another disadvantage of an unnecessarily larger gas pressure is the stress exerted onto the equipment of the heat generating device by the high temperature generated by the larger gas pressure. For example involving a water heater, if the pressure of the gaseous fluid is about 3.5 to about 3.75 inch WC, and the chamber temperature of the water heater rises to about 556° F., then when the remaining high temperature and excess gaseous fluid is discharged into the diverter and through the stack pipe, the temperature of the stack pipe rises to about 560° F. This is a substantial temperature, and such a high heat can denature the properties of the diverter and stack pipe, among other equipment. Another example involving a gas furnace, a higher gas pressure results in a higher operating temperature of the furnace. A higher temperature can cause the heat exchanger to overheat, which can lead to flaking of the heat exchanger. Flaking damages and reduces the life of the heat exchanger. Therefore, when the equipment of the heat generating device gets overheated, it can lead to a reduced working lifespan of the equipment in question.

Another disadvantage of having the gaseous fluid flow out from the supply and into the heat generating device at such a relative high pressure is that the quality of flames produced in the burner manifold are reduced. For a combustion reaction to occur, an oxidant is needed, like the oxygen mixture present in the surrounding air. A greater oxidant presence results in a more complete combustion reaction. A more complete combustion reaction decreases the amount of black body-radiating soot that is produced. A reduced amount of soot allows for the flame to burn cleaner, which allows the flame to achieve a higher temperature, thereby making the flame more efficient. When gas is present at a higher pressure, less of an oxidant is available to interact with the pilot light flame. If less of an oxygen mixture is available, the resulting flames produced when the pilot light ignites the gaseous fluid expelled by the supply line are not as clean and efficient since more soot is produced because the combustion reaction occurring is not as complete.

The last disadvantage of having gaseous fluid flow out of the gas supply and into the heat generating device at such a relative high pressure is that for certain heat generating devices the high pressure can contribute to detrimental health effects for the occupants of the building. If the heat generating device is a furnace, a higher pressured gas flowing into the furnace can lead to health problems. The reasons for this are that a higher gaseous fluid pressure results in a higher operating temperature of the furnace. A higher operating temperature can cause the furnace to operate less frequently and for a shorter period of time during operation. If the furnace operates less frequently than so does the humidifier associated with the furnace. If a humidifier doesn't run as often, the air inside the dwelling can become dry. Further, if a furnace operates less frequently, than the blower in the furnace operates less as well. By reducing the amount of blower time, the air within the dwelling becomes less circulated. Health problems can arise when the air inside the home is too dry or when the air is stagnant or both. Dry air can cause drying of the membrane linings of the nose, throat, and the bronchial tubes, which can lead to respiratory infections and other illnesses. Stagnant air can increase issues for those with allergy and asthma problems, among others.

It is desirable for a valve to reduce the reference pressure of a gaseous fluid flowing from a gas supply to a lower range of pressures to reduce the amount of gaseous fluid that is wasted, to reduce the amount of unnecessary wear and tear for prolonging the life of the equipment present in a heat generating device, to produce a cleaner and more efficient flame, and to reduce contributing to health problems as may be associated with certain heat generating devices.

Thus, a gas saver valve addressing the aforementioned problems is desired.

SUMMARY OF THE INVENTION

Gas saver valves and methods for regulating gas flow directed to pressure regulation are provided. The gas saver valve has a valve body and a regulator within the valve body that adjusts the pressure of a gaseous fluid flowing through the valve body. A control member engaged with the regulator allows a user to adjust the regulator for selectively controlling the gas pressure of the gaseous fluid flowing through the valve body.

The control member includes a plurality of marked settings that are calibrated to correspond to a value of gas pressure. Each of the individual marked settings corresponds to an amount of gas pressure out of a plurality of gas pressures. The marked settings include settings that are within a range of gas pressure values that are less than a reference gas pressure for the operation of a heat generating device. The reference gas pressure and the range of gas pressure generate a temperature in an operational range of the heat generating device. An indicator indicates a selected gas pressure to flow through the valve body when the indicator corresponds to a selected marked setting of the control member.

A method for regulating flow of a gaseous fluid includes the step of placing a gas saver valve in communication with a supply of gaseous fluid and a heat generating device, the gas saver valve including a regulator to adjust a gas pressure of the gaseous fluid and a control member calibrated with a plurality of marked settings each corresponding to a value of the gas pressure. The regulator allows for the adjustment of gas pressure of the gaseous fluid flowing through the gas saver valve. The method also includes a step of selecting a gas pressure to flow through the regulator by adjusting the control member to a calibrated marked setting of one or more of the marked settings in a range of gas pressure less than a reference gas pressure in operating the heat generating device, the reference gas pressure and the range of gas pressure generating a temperature in an operational range of the heat generating device. The method further includes a step of indicating by an indicator the selected calibrated value of the gas pressure to flow through the regulator corresponding to the selected marked setting of the control member. The method also includes a step of adjusting the gas pressure of the gaseous fluid by the regulator to the selected calibrated value as indicated by the indicator in the range of gas pressure less than the reference gas pressure in operating the heat generating device.

These and other features of the present invention will become readily apparent upon further review of the following specification and drawings.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

Figure 1:
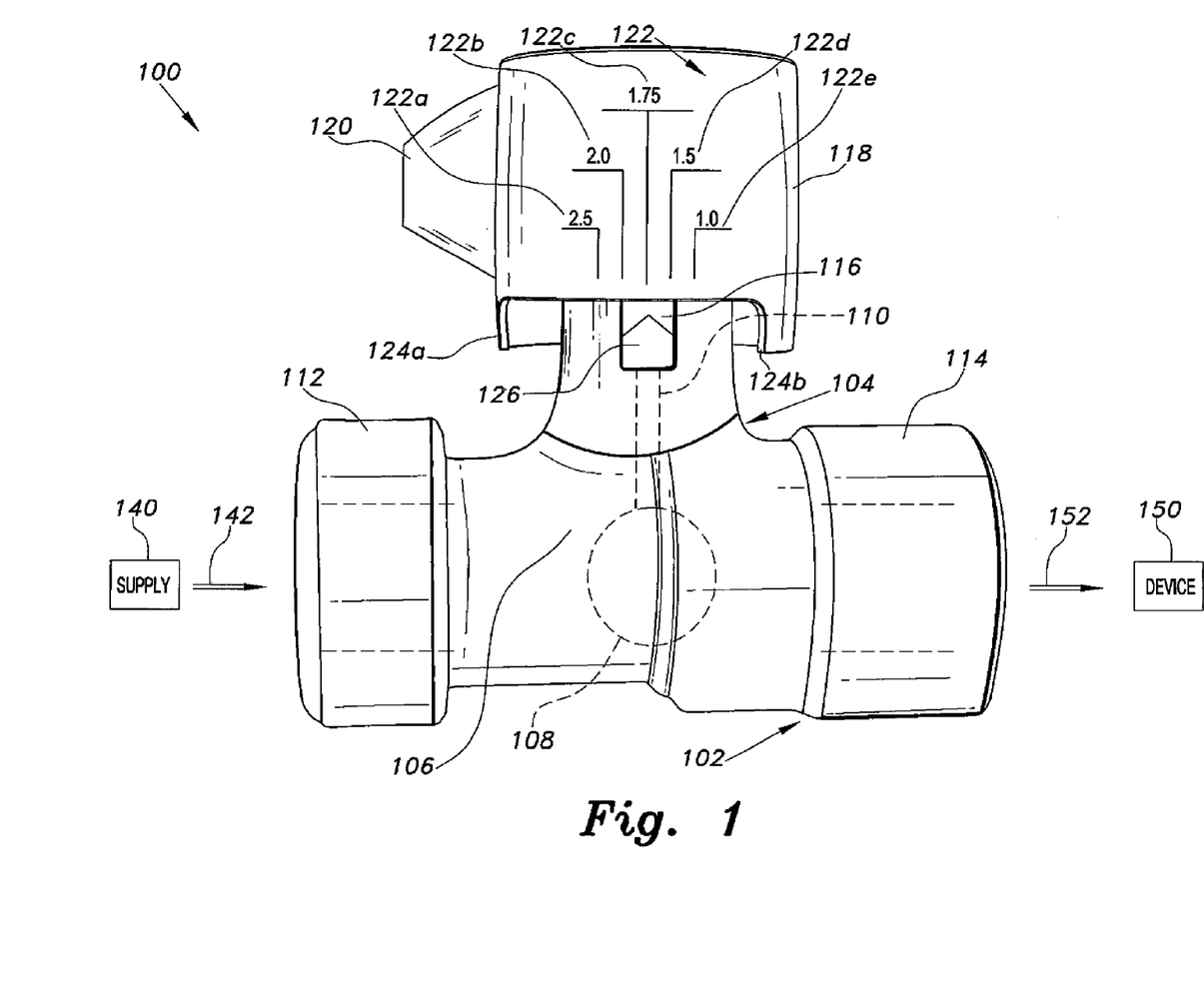
FIG. 1 is a front view of an embodiment of a gas saver valve according to the present invention.

Referring to FIG. 1, an embodiment of a gas saver valve 100 is shown. The gas saver valve 100 is connected with a gas supply 140 that delivers a gaseous fluid to a heat generating device 150. The gas supply 140 can be a gas pipe arrangement that is in communication with a gas distribution line from a utility. Or the gas supply 140 can be a gaseous fluid reservoir, such as a gas tank. The gaseous fluid flowing out 142 from the gas supply 140 and flowing into and out 152 the gas saver valve 100 can be a number of different substances, including natural gas or propane gas, or any other gaseous fluid that is ignited to generate heat, for example. The heat generating device 150 can be any number of heat generating devices, including a water heater, a furnace, a clothes dryer, water boiler, steam boiler, or any other common device used to generate and distribute heat, for example.

The gaseous fluid flows outward 142 from the gas supply 140 and into the inlet 112 of the valve body 102 of the gas saver valve 100. The gaseous fluid then flows through a regulator 106 located within the valve body 102. The regulator 106 includes a ball 108 and a stem 110. The ball 108 is positioned with the valve body 102 and has a passageway through it to allow the gaseous fluid to flow from the inlet 112, through the valve body 102, and out through the outlet 114 so that the gaseous fluid flows outward 152 to a heat generating device 150. The stem 110 of the regulator 106 is positioned within the neck 104 of the valve body 102. The stem 110 is engaged with a control member 118 to allow for the adjustment of the regulator 106 by the control member 118 to control the gaseous fluid flow.

A stopper 116 is located on the neck 104 of the valve body 102. The stopper acts as a rotational impediment to control member 118 by engaging with abutments 124a and 124b of control member 118 to prevent unintended rotation of control member 118. Positioned on the control member 118 is a handle 120 to assist in manipulation of the control member 118. The handle 120 can come in any form, including a strap or knob, among other shapes. It is noted that the handle 120 is an assistance aid for the user, and if the user's needs do not require a handle 120 on the control member 118, than the handle 120 can be removed.

The control member 118 includes a plurality of marked settings 122. The plurality of marked settings 122 are calibrated to correspond to a value of gas pressure of the gaseous fluid flowing through the valve body 102. Each of the individual marked settings 122a, 122b, 122c, 122d, and 122e, correspond to and are calibrated to an amount of gas pressure that occurs when the ball 108 of regulator 106 is positioned in a certain orientation within the valve body 102. For example, the marked setting 122a representing a pressure of 2.5 inches of Water Column has the ball 108 of the valve body 102 in a position that is closer to a fully open position orientation of the ball 108 relative to the valve body 102. In the fully open position, the passageway of the ball 108 is oriented to enable a gaseous fluid to fully flow through the valve body 102, in contrast to a fully closed position where the passageway of the ball 108 is oriented relative to the valve body 102 to prohibit the gaseous fluid flow through the valve body 102.

The measurement units of the gas pressure of the gaseous fluid can be set to a number of different units, including Inches of Water Column (inch WC), Pascals (Pa), Pounds per Square Inch (Psi), or any other common unit that signifies a measurement of gas pressure. In FIG. 1 the plurality of marked settings 122 are designated in units of pressure of inch WC. The plurality of marked settings 122 are arranged in a range of pressures spanning 1.0 inch WC through 2.5 inch WC. Common heat generating devices are configured to accept a range of pressure of around 4.0 inch WC, for example. If a gas supply 140 is in the arrangement of gas pipes receiving gaseous fluid from a utility, the typical pressure of the gaseous fluid flowing out from the gas supply 140, as can correspond to a reference gas pressure of the heat generating device 150, is about 3.5 inch WC to about 3.75 inch WC, for example. Therefore, it is appreciated that the range of pressures for the plurality of marked settings 122 are set between about 1.0 inch WC to about 2.5 inch WC. However, depending on the user's requirements and the capacity of the heat generating device 150, the values of the range of gas pressure for the plurality of marked settings 122 can be set to any value needed, but the values of the gas pressure are in a range including gas pressures less than the reference pressure, the reference gas pressure typically can be the gas pressure flowing out 142 from the gas supply 140, for example, but can be other than the gas supply 140 gas pressure of the gaseous fluid.

When a user determines the amount of gas pressure that is desired for the task at hand, the user adjusts the control member 118 so that an individual marked setting 122a, 122b, 122c, 122d, or 122e out of the plurality of marked settings 122 is aligned with an indicator 126. The indicator 126 allows for the user to ensure that the orientation of the ball 108 of the regulator 106 within the valve body 102 is aligned in a corresponding orientation to produce the designated calibrated value of a corresponding amount of gas pressure. The indicator 126 is positioned on the stopper 116 located on the neck 104 of the valve body 102. However, depending on the user's needs, the indicator 126 can be positioned anywhere on the valve body 102 or even away from the valve body 102 as long as it is visible or accessible to the user, for example.

Figure 2:
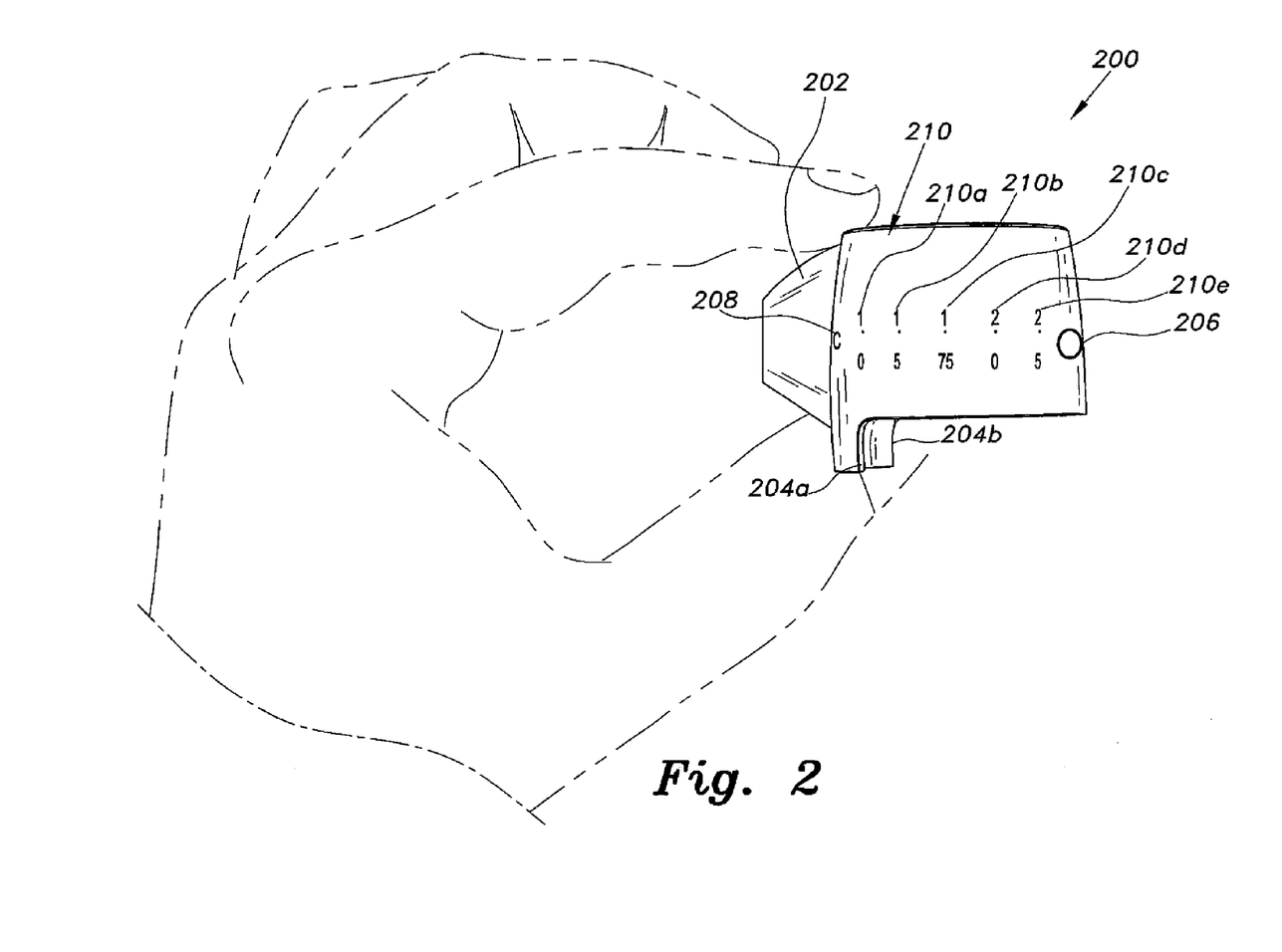
FIG. 2 is a front view of a control member of embodiments of a gas saver valve according to the present invention.

Referring to FIG. 2, another embodiment of a control member 200 is shown. The control member 200 includes a handle 202 for assistance in manipulating the control member 200. The handle 202 can come in various forms, including a strap or knob. A plurality of abutments 204a and 204b prevent the control member 200 from being rotated past the required position by braking against stopper 116 of FIG. 1 or stopper 312 of FIG. 3. Located on the control member 200 is a plurality of marked settings 210 which are calibrated to correspond to a value of gas pressure. The plurality of marked settings 210 are calibrated to correspond to a value of a gas pressure of a gaseous fluid flowing through a gas saver valve, such as the gas saver valves 100 or 300, since control member 200 is interchangeable with either valve body 102 or the valve body 302, for example.

Figure 3:
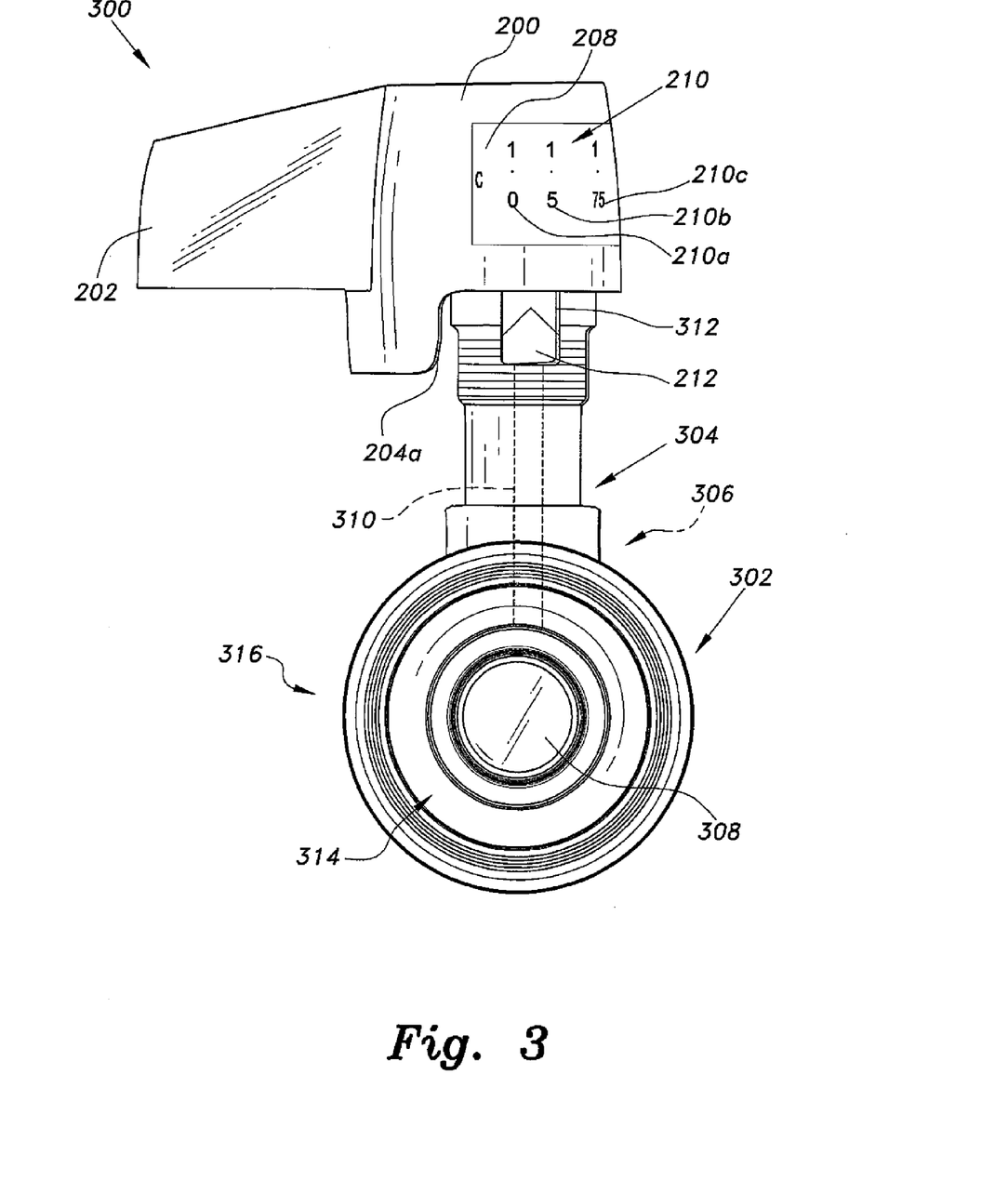
FIG. 3 is a side view of an embodiment of a gas saver valve according to the present invention.

Each of the individual marked settings 210a, 210b, 210c, 210d, and 210e correspond to a calibrated value of an amount of gas pressure. The amount of gas pressure can include a number of different measurement units, including inch WC, Psi, Pa, or any other unit that measures fluid pressure. As shown in FIGS. 2 and 3, the individual marked settings 210a, 210b, 210c, 210d, and 210e are set in measurement units of inch WC, for example. Individual marked setting 210a is set to a value of about 1.0 inch WC, marked setting 210b is set to a value of about 1.5 inch WC, marked setting 210c is set to a value of about 1.75 inch WC, marked setting 210d is set to a value of about 2.0 inch WC, and marked setting 210e is set to a value of about 2.5 inch WC. These individual marked settings 210a-210e represent calibrated values of gas pressures in a range of gas pressures. This range of calibrated values of gas pressure will include gas pressures lower than a reference gas pressure, which typically can be the value of the pressure of the gaseous fluid that flows outward 142 from the gas supply 140 without any adjustments, for example, but the reference gas pressure can be other than the gas supply 140 gas pressure of the gaseous fluid. Typically, the reference gas pressure is about 3.5 inch WC to about 3.75 inch WC, for example.

In addition to the individual calibrated marked settings 210a, 210b, 210c, 210d and 210e, are designations for an "Open" setting 206 and a "Closed" setting 208, shown as "O" and "C" respectively. The "O" and "C" settings 206 and 208 also represent positions on how the regulator is orientated. If the user sets the control member 200 to the "O" setting 206 corresponding to a fully open position of the ball 108 or the ball 308, then the gaseous fluid can flow substantially unrestricted through the gas saver valve 100 or gas saver valve 300 because the passageway of ball 108 or the ball 308 is oriented for the gaseous fluid to fully flow through the valve body 102 or the valve body 302. If the user sets the control member 200 to the "C" setting 208 corresponding to a fully closed position of the ball 108 or the ball 308, then the gaseous fluid is prevented from flowing freely through the valve body 102 or the valve body 302 from one end to the other end of the valve body 102 or the valve body 302.

Referring to FIG. 3, another embodiment of a gas saver valve 300 is shown, for example. The gas saver valve 300 includes the valve body 302 having a neck 304. Positioned within valve body 302 is a regulator 306 for adjusting the gas pressure of the gaseous fluid flowing through the valve body 302. The regulator 306 has a ball 308 that permits and controls the gaseous fluid flowing from the inlet 314 and through the valve body 302 and out the outlet 316. The regulator 306 is engaged to the control member 200 by the stem 310 to allow the control member 200 to adjust the regulator 306 as needed by the user. Control member 200 can be removed from the valve body 302 and positioned onto the gas saver valve 100 of FIG. 1, for example. As shown in FIG. 3, the stem 310 is positioned within the neck 304 of the valve body 302. However, the stem 310 can be positioned at various locations within the valve body 302 as long as the stem 310 can engage with the ball 308 and the control member 200. It should be noted that control member 118 of FIG. 1 can be used with the gas saver valve 300 of FIG. 3, since the control members 108 and 200 are removably engaged with the stem 110 or the stem 310, for example.

The control member 200 includes the handle 202 to assist in the manipulation of the control member 200. The handle 202 can come in a variety of forms, including a latch or a knob, among others. The control member 200 also includes an abutment 204a that prevents the rotation of the control member 200 beyond an unnecessary position by braking against a stopper 312 located on the neck 304 of the valve body 302 of the gas saver valve 300. As depicted in FIG. 3, an indicator 212 is positioned on the stopper 312. The indicator 212 allows the user to visualize and assists in setting the orientation of the ball 308 of the regulator 306 that generates the amount of gas pressure designated on and corresponding to the individual marked setting 210a, 210b, 210c, 210d, or 210e, for example. The marked setting 210a, for example, representing a pressure of 1.0 inches of Water Column, has the ball 308 of the valve 300 in a partially open orientation relative to the valve body 302 that is closer to a fully closed position orientation of the ball 308. In a fully closed position, the passageway of the ball 308 is orientated to prohibit flow of gaseous fluid flow through the valve body 302, as opposed to the fully open position where the passageway of the ball 308 is oriented to allow the gaseous fluid to fully flow through the valve body 302, for example.

Figure 4A:
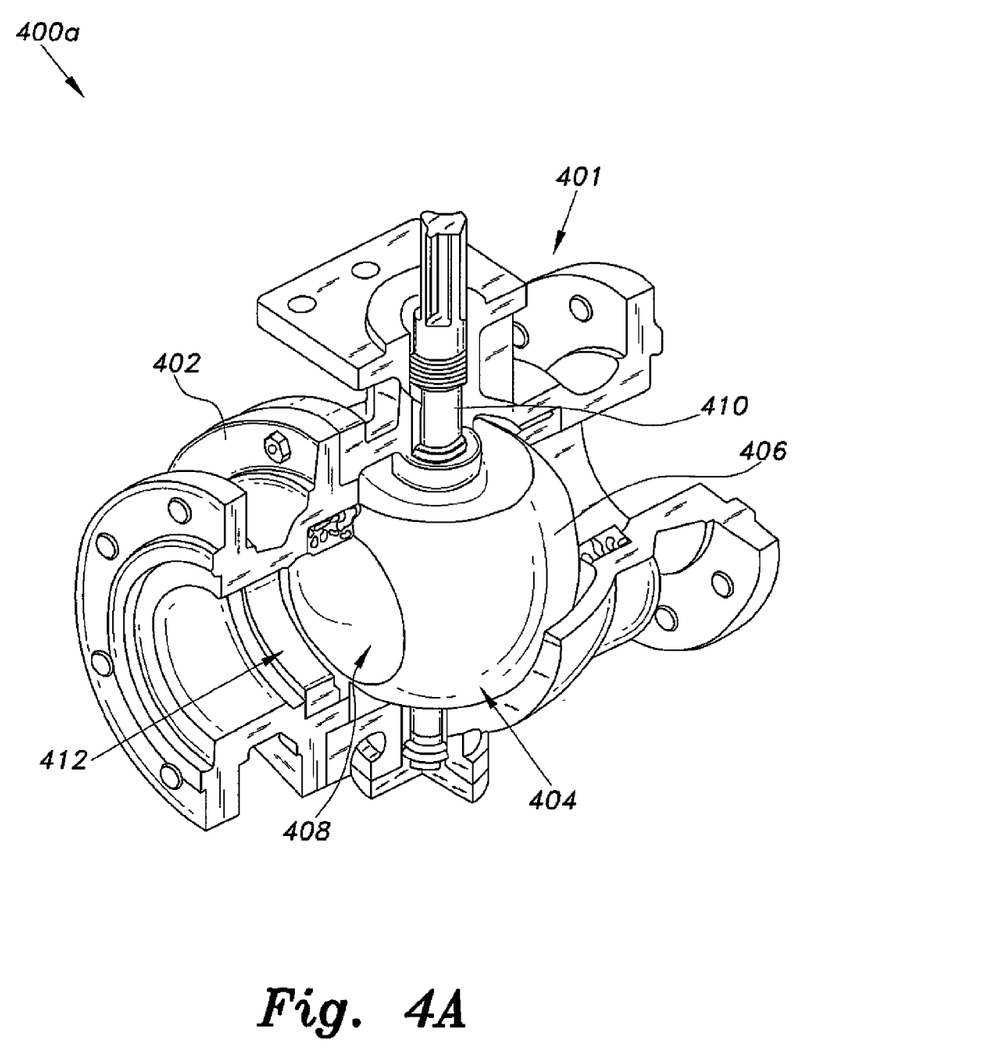
FIG. 4A is an internal perspective view of a regulator of embodiments of a gas saver valve according to the present invention.

Referring to FIG. 4A, an internal perspective 400a of an example of a valve 401 as can correspond to the valves 100 and 300 of FIGS. 1 and 3, for example, is shown. The valve 401 has a valve body 402 with a regulator 404. The regulator 404 includes a ball 406 with a passageway 408 that extends through the ball 406 and a stem 410 connected to the ball 406. The stem 410 serves as a communicating mechanism between a control member, such as control member 118 in FIG. 1 and control member 200 in FIGS. 2 and 3, and the ball 406, such as the ball 108 in FIG. 1, and the ball 308 in FIG. 3, and the ball 406 in FIG. 4A. As depicted in FIG. 4A, the ball 406 is in a fully "open" position 412. When the ball 406 is in the fully open position 412, gaseous fluid can fully flow from one end of the valve body 402 to the other end. While in the fully open position 412, the passageway 408 is oriented in a relatively straight, substantially unrestricted, orientation relative to the gaseous fluid flow through the valve body 402. When the ball 406 is orientated in the fully open position 412, the pressure of the gaseous fluid flowing through the valve body 402 is at a higher level, such as can correspond to the reference gas pressure for the heat generating device 150, for example.

Figure 4B:
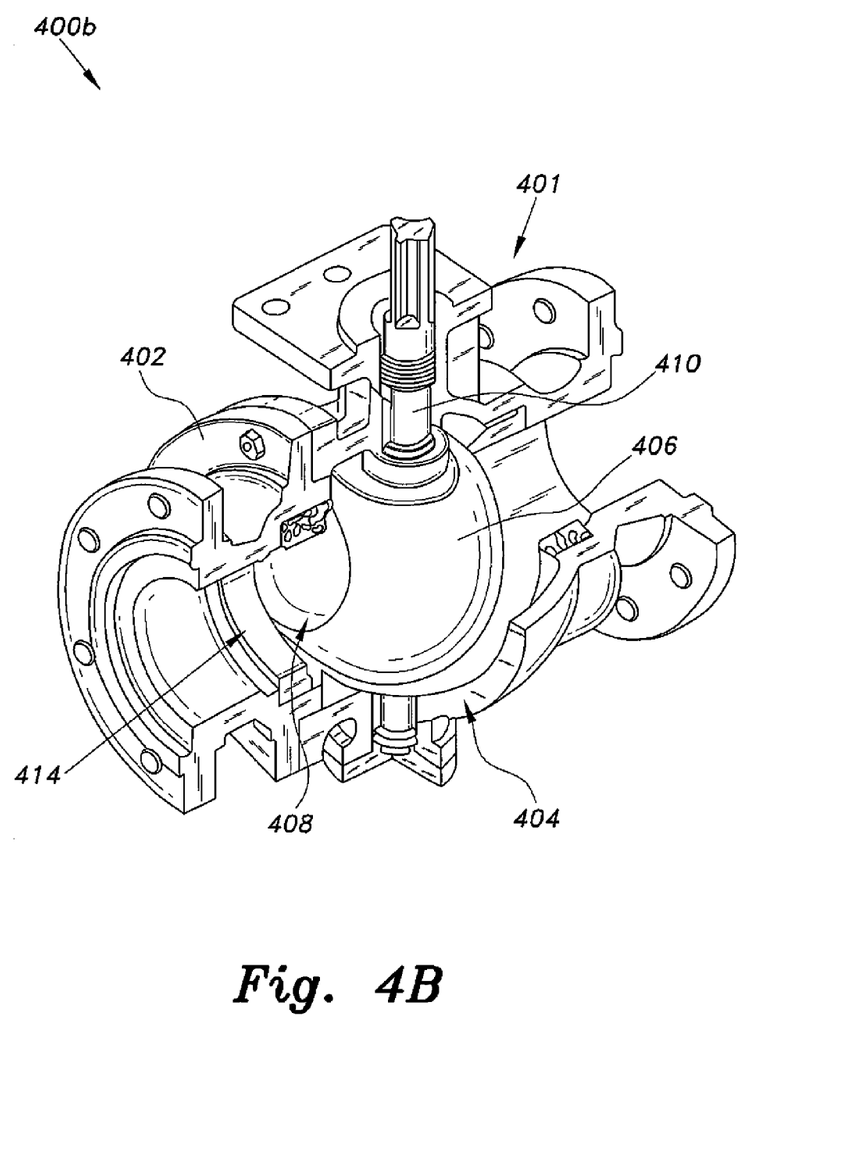
FIG. 4B is an internal perspective view of a regulator of embodiments of a gas saver valve according to the present invention.

Referring to FIG. 4B, an internal perspective 400b of the valve body 402 of the valve 401 with the regulator 404 is shown. The regulator 404 includes the ball 406 with the passageway 408 that extends through the ball 406 and the stem 410 connected to the ball 406. The stem 410 serves as a communicating mechanism between a control member, such as the control member 118 in FIG. 1 and the control member 200 in FIGS. 2-3, and the ball 406, such as the ball 108 in FIG. 1, the ball 308 in FIG. 3, and the ball 406 in FIG. 4B. As depicted, the ball 406 is in an "intermediate" position 414. When the ball 406 is in the intermediate position 414, gaseous fluid cannot fully flow from one end of the valve body 402 to the other end, because the passageway 408 is in a partially closed orientation relative to the direction of flow of the gaseous fluid through the valve body 402, and the flow of the gaseous fluid is partially restricted through the valve body 402. When the ball 406 is oriented in the partially closed orientation in the intermediate position 414, the gas pressure of the gaseous fluid flowing through the valve body 402 is at a lower gas pressure level than compared to when the ball 406 is orientated to the fully open position 412. Such intermediate position 414, or intermediate positions 414, can include gas pressures in a range of gas pressure that can be less than a reference gas pressure, for example, generating a temperature in an operational range of the heat generating device 150 in operating the heat generating device 150.

Figure 4C:
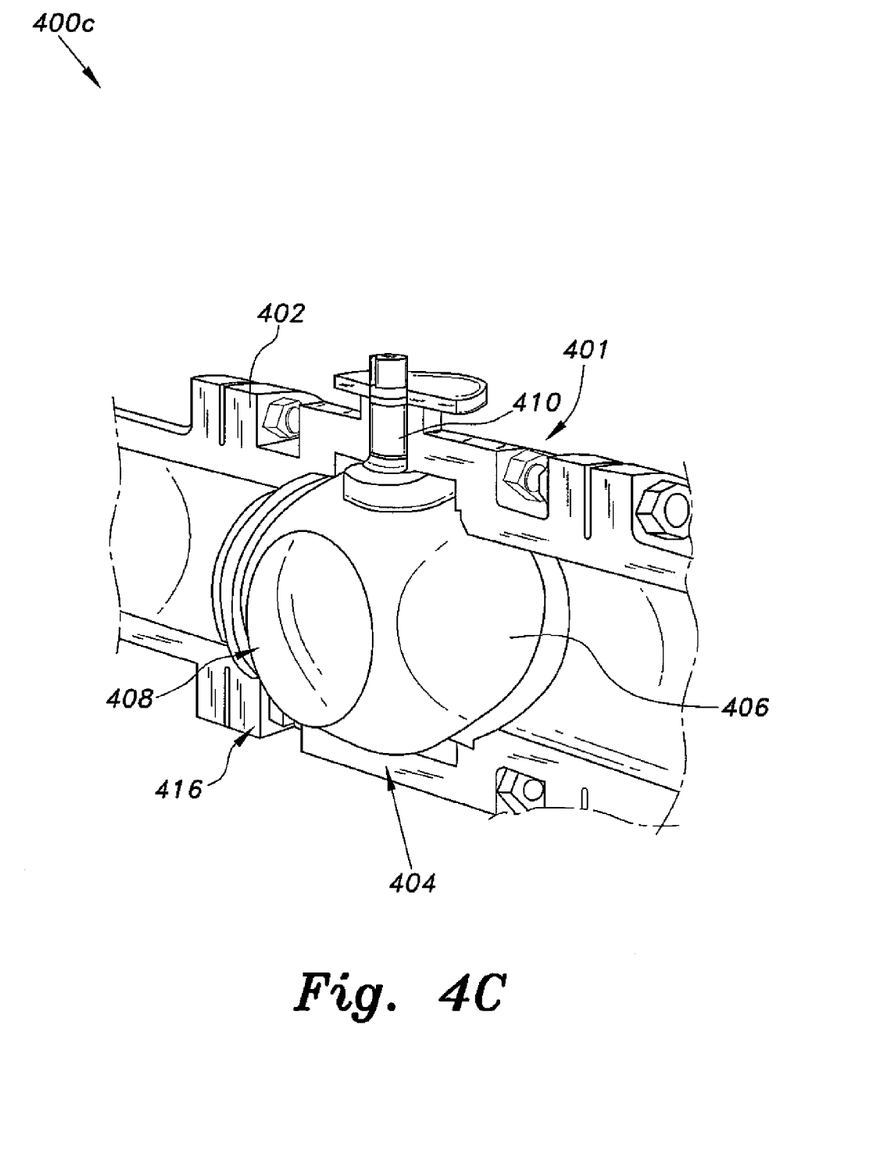
FIG. 4C is an internal perspective view of a regulator of embodiments of a gas saver valve according to the present invention.

Referring to FIG. 4C, an internal perspective 400c of the valve body 402 of the valve 401 with the regulator 404 is shown. The regulator 404 includes the ball 406 with the passageway 408 that extends through the ball 406 and the stem 410 connected to the ball 406. The stem 410 serves as a communicating mechanism between a control member, such as the control member 118 in FIG. 1 and the control member 200 in FIGS. 2-3, and the ball 406, such as the ball 108 in FIG. 1, the ball 308 in FIG. 3, and the ball 406 in FIG. 4C. As depicted in FIG. 4C, the ball 406 is oriented in a fully "closed" position 416. When the ball 406 is oriented in the fully closed position 416, the gaseous fluid cannot flow from one end of the valve body 402 to the other end, because the passageway 408 is fully closed in relation to the direction of flow through the valve body 402, and the gaseous fluid is substantially fully restricted from flowing through the valve body 402.

Gas saver valves, such as gas saver valves 100 and 300, are used between the gas supply 140 and the heat generating device 150. Embodiments of a gas saver valve, such as the gas saver valves 100 and 300, can be used with a number of different heat generating devices, including a water heater, a furnace, a clothes dryer, water boiler, steam boiler, or any other common device used to generate and distribute heat, for example. Table 1 below shows various gas saving benefits of using embodiments of a gas saver valve, such as the gas saver valves 100 or 300, in conjunction with a water heater as the heat generating device 150, for example.

TABLE 1

Gas Savings on Natural Gas Fueled Water Heater using Gas Saver Valve (GSV)

| | Gas Pressure (inch WC) | Chamber Temperature (Degrees F.) | Water Temperature (Degrees F.) | Gas Savings (inch WC) |
|---|---|---|---|---|
| Without GSV (Control) | 3.5 to 3.75 | 556 | 130 | 0 |
| With GSV | 2.5 | 532 | 130 | 1.0 to 1.25 |
| With GSV | 2.0 | 495 | 130 | 1.5 to 1.75 |
| With GSV | 1.75 | 480 | 130 | 1.75 to 2.0 |
| With GSV | 1.5 | 473 | 130 | 2.0 to 2.25 |
| With GSV | 1.0 | 445 | 130 | 2.5 to 2.75 |

Table 1 shows the benefits of using a gas saver valve, such as the gas saver valves 100 or 300, in conjunction with a typical water heater as the heat generating device 150. The reference pressure of the gaseous fluid, as can correspond to the gas pressure coming outward 142 of the gas supply 140, is at a reference pressure of about 3.5 inch WC to about 3.75 inch WC, which serves as the control for the data in Table 1, since the pressure has not been adjusted. By implementing a gas saver valve, such as the gas saver valves 100 or 300, a user can reduce the gas pressure of the gaseous fluid flowing into 152 and into the water heater as the heat generating device 150. The user can lower the pressure to a range of pressures of about 1.0 inch WC to about 2.5 inch WC, for example.

As shown in Table 1, when a user adjusts the pressure to 2.5 inch WC, the user can generate a chamber temperature of about 532° F. A chamber temperature of 532° F. is more than enough of a temperature to raise the incoming cold water temperature to a target temperature of 130° F. This target temperature of 130° F. was reached by averaging the range of thermostat temperature settings recommended by many manufacturers who suggest a thermostat setting of about 120° F. to 140° F. By reducing the pressure of the gaseous fluid to 2.5 inch WC, the user can have a savings of about 1.0 inch WC to about 1.25 inch WC while still being able to generate a desired water temperature of 130° F. If the user adjusts control member 118 or 200 on gas saver valve 100 or 300 to a setting of 2.0 inch WC, the chamber temperature becomes about 495° F. and the gas savings is about 1.5 inch WC to about 1.75 inch WC. If the user adjusts the control member 118 or 200 on a gas saver valve, such as the gas saver valves 100 or 300, to a setting of 1.75 inch WC, the chamber temperature becomes about 480° F. and the gas savings is about 1.75 inch WC to about 2.0 inch WC. If the user adjusts the control member 118 or the control member 200 on a gas saver valve, such as the gas saver valves 100 or 300, to a setting of 1.5 inch WC, the chamber temperature becomes about 473° F. and the gas savings is about 2.0 inch WC to about 2.25 inch WC. Finally, if the user adjusts the control member 118 or the control member 200 on a gas saver valve, such as gas saver valves 100 or 300, to a setting of 1.0 inch WC, the chamber temperature becomes about 445° F. and the user enjoys a savings of about 2.5 inch WC to about 2.75 inch WC. In each case in Table 1, the selected calibrated value of the gas pressure and the reference gas pressure, as can correspond to the gas pressure coming outward 142 of the gas supply 140, generate a temperature in the operational range of the heat generating device, such as from 556° F. to 445° F. for the water heater in Table 1.

Table 1 shows various benefits of implementing embodiments of a gas saver valve, such as gas saver valves 100 or 300, for a heat generating device 150 that is a water heater. The user adjusts the control member 118 or the control member 200 to a desired setting of gas pressure. The temperature generated from the reduced gas pressure is still enough to raise the water temperature to an acceptable recommended temperature, such as to raise the water temperature to 130° F. for the water heater in Table 1, when the water heater operates in the operational range of the heat generating device 150, for example.

Table 2 below shows different values of quantifiable properties when pressure is reduced using a gas saver valve, such as the gas saver valves 100 or 300, in conjunction with a water heater as the heat generating device 150. The water heater used for the determination of the air quality properties of Table 2 was a typical 50 Gallon water heater, for example, such as can be heated with 40,000 BTUs.

pipe is 560° F., and the temperature of the ambient air surrounding the water heater is 85.7° F.

However, as shown in Table 2, when a user implements a gas saver valve, such as the gas saver valves 100 or 300, and sets the pressure at 2.5 inch WC, the presence of $O_2$ is 10.3%, which is an increase of 3% over the control. At 2.0 inch WC, the presence of $O_2$ is 11.7%, which is an increase of 4.4% over the control. At 1.75 inch WC, the presence of $O_2$ is 12.4%, which is an increase of 5.1% over the control. At 1.5 inch WC, the presence of $O_2$ is 13.1%, which is an increase of 5.8% over the control. Finally, at a pressure of 1.0 inch WC, the presence of $O_2$ is 14.6%, which is an increase of 7.3% over the control. An increased oxidant presence, such as di-oxygen, allows for a more complete combustion. A more complete combustion can allow for a cleaner flame since a complete combustion reduces the amount of black body-radiating soot. A reduced amount of soot can allow for the flame to burn cleaner, which allows the flame to achieve a higher temperature, thereby making the flame more efficient.

Also, as shown from Table 2, an increasing di-oxygen presence has a direct correlation to a decreasing carbon dioxide ($CO_2$) presence since the increased amount of $O_2$ can lower the $CO_2$ out of the combustion reaction. The increased

TABLE 2

Natural Gas Fueled Water Heater Air Quality Properties using a Gas Saver Valve

| | $O_2$ Presence % | $CO_2$ Presence % | % of Extra Air | Water Heater Eff. | CO Presence | Temp of Stack Pipe | Temp of ambient air |
|---|---|---|---|---|---|---|---|
| 3.5 inch WC (control) | 7.3% | 7.7% | 47.8% | 75.7% | 0 PPM | 560° F. | 85.7° F. |
| 2.5 inch WC | 10.3% | 6.0% | 86.7% | 73.4% | 0 PPM | 528° F. | 84.9° F. |
| 2.0 inch WC | 11.7% | 5.2% | 113.3% | 72.9% | 0 PPM | 489° F. | 83.2° F. |
| 1.75 inch WC | 12.4% | 4.8% | 130.4% | 72.4% | 0 PPM | 470° F. | 81.7° F. |
| 1.5 inch WC | 13.1% | 4.4% | 150.1% | 71.5% | 0 PPM | 458° F. | 80.4° F. |
| 1.0 inch WC | 14.6% | 3.5% | 207.0% | 69.4% | 0 PPM | 426° F. | 79.5° F. |

Table 2 shows various benefits of using a gas saver valve, such as the gas saver valves 100 or 300, in conjunction with a typical water heater as the heat generating device 150 in relation to various air quality properties. The reference pressure of the gaseous fluid, as can correspond to the gas pressure coming outward 142 of the gas supply 140, is at a reference pressure of about 3.5 inch WC to about 3.75 inch WC, which serves as the control for the above data in Table 2, since the pressure has not been adjusted. By implementing a gas saver valve, such as the gas saver valves 100 or 300, a user can reduce the gas pressure of the gaseous fluid flowing into 152 the water heater as the heat generating device 150. The user can lower the pressure to a range of pressures of about 1.0 inch WC to about 2.5 inch WC, for example.

Referring to Table 2, when a user does not implement a gas saver valve, such as does not implement the gas saver valves 100 or 300, the pressure of the gaseous fluid flowing into 152 the heating generating device 150 is about 3.5 inch WC to about 3.75 inch WC. The properties of the control are $O_2$ presence percentage of 7.3%, $CO_2$ presence percentage of 7.7%, percentage of additional air available for combustion is 47.8%, efficiency of the water heater is 75.7%, presence of carbon monoxide is 0 PPM, temperature of the venting stack amount of oxidant $O_2$ and the decreased amount of $CO_2$ can be seen at the different pressure settings. At 2.5 inch WC, the $O_2$ presence is 10.3% and the $CO_2$ presence is 6.0%. At 2.0 inch WC, the $O_2$ presence is 11.7% and the $CO_2$ presence is 5.2%. At 1.75 inch WC, the $O_2$ presence is 12.4% and the $CO_2$ presence is 4.8%. At 1.5 inch WC, the $O_2$ presence is 13.1% and the $CO_2$ presence is 4.4%. Finally, at 1.0 inch WC, the $O_2$ presence is 14.6% and the $CO_2$ presence is 3.5%. Therefore, embodiments of a gas saver valve, such as the gas saver valves 100 or 300, can allow for an increased oxidant presence of $O_2$ and a decreased $CO_2$ presence, for example.

An increased amount of air entering the burner manifold can allow for an increased presence of oxidant $O_2$. As seen in Table 2, the control provides for 47.8% additional air to enter the burner manifold which translates to 7.3% of oxidant $O_2$ to be available for combustion. When a gas saver valve, such as the gas saver valves 100 or 300, is implemented, a greater amount of air is allowed to enter the burner manifold which can provide for an increased amount of oxidant $O_2$ to allow for a more complete combustion. For example, when a gas saver valve, such as the gas saver valve 100 or 300 is set to a pressure of 2.5 inch WC, the amount of additional air entering the burner manifold is 86.7%, translating to amount of 10.3% $O_2$ available for combustion. At 2.0 inch WC, the additional air is 113.3%, which translates to 11.7% of $O_2$ available for combustion. At 1.75 inch WC, the additional air entering the burner manifold is 130.4%, which translates to 12.4% of $O_2$ available for combustion. At 1.5 inch WC, the additional air is 150.1%, which translates to 13.1% of $O_2$ available for combustion. Finally, at 1.0 inch WC, the additional air entering the burner manifold is 207.0%, a substantial increase over the control which is at 47.8%%, which translates to 14.6% of $O_2$ available for combustion.

Table 2 further shows how embodiments of a gas saver valve, such as the gas saver valves 100 or 300, can affect the efficiency of the water heater as the heat generating device 150. The control provides for an efficiency of 75.7%, while the decreased settings of gas pressure on a gas saver valve, such as gas saver valves 100 or 300, provide for a decreased efficiency. While this may seem like a disadvantage using a gas saver valve since the efficiency rating decreases, this is not the case. The efficiency rating for a water heater indicates how much of the energy generated is being used and how much is being dispelled through the stack pipe vent. For example, an 80% efficiency water heater will provide 800 British Thermal Units (BTUs) of heat for every 1000 BTUs it burns, with the remaining 200 BTUs not used and lost through the stack pipe vent. When a gas saver valve is used and the pressure is set to a lower pressure setting than the control, the user can experience a cleaner flame because of the increased oxidant amount available to allow for a more complete combustion. A more complete combustion can allow for a cleaner flame since less black body-radiating soot is produced. A cleaner flame can allow for the flame to achieve a higher temperature. If the flame is at an increased temperature, it can allow for a higher heating rate to occur at less of a gas pressure. The standard water heater is typically designed to accommodate a gas pressure of 4.0 inch WC, for example, so as the pressure is decreased to a lesser value than 4.0 inch WC, for example, the water heater appears to be less efficient. However, in reality, the water heater is actually gaining efficiency since the reduced gas pressures typically can allow for a cleaner flame that burns at a higher temperature. Therefore, the efficiency rating may not appear to provide for an accurate assessment of the various benefits of using a gas saver valve, such as the gas saver valves 100 or 300.

Table 2 provides further information that shows the benefits of using embodiments of a gas saver valve, such as the gas saver valves 100 or 300. The combustion reaction from a water heater as the heat generating device 150 generally does not provide for detectable levels of carbon monoxide (CO), regardless of the gas pressure. Also, Table 2 indicates various advantages related to an increased product life considering the temperature of the stack pipe venting the unused gas and heat and the temperature of the ambient air surrounding the water heater. When a gas saver valve, such as the gas saver valves 100 or 300, is not implemented, the control provides a stack pipe temperature of 560° F. and an ambient surrounding air temperature of the water heater at 85.7° F. However, when a gas saver valve, such as the gas saver valves 100 or 300, is used, for example, when the pressure is set at 2.5 inch WC, the temperature of the stack pipe is 528° F., a decrease of 32° F. from the control. The temperature of the ambient air surrounding the water heater is 84.9° F., a decrease of 0.8° F. from the control. At 2.0 inch WC, the temperature of the stack pipe is 489° F., a decrease of 71° F. from the control. Also, the temperature of the ambient air surrounding the water heater, when the gas pressure is at 2.0 inch WC, is 83.2° F., a decrease of 2.5° F. over the control. At 1.75 inch WC, the temperature of the stack pipe is 470° F., a decrease of 90° F. from the control. Further, the temperature of the ambient air surrounding the water heater, when the gas pressure is at 1.75 inch WC, is 81.7° F., a decrease of 4.0° F. over the control. At 1.5 inch WC, the temperature of the stack pipe is 458° F., a decrease of 102° F. over the control. Also, the temperature of the ambient air surrounding the water heater, when the gas pressure is at 1.5 inch WC, is 80.4° F., a decrease of 5.3° F. over the control. Finally, at a gas pressure of 1.0 inch WC, the temperature of the stack pipe is 426° F., a decrease of 134° F. over the control. Further, the temperature of the ambient air surrounding the water heater, when the gas pressure is at 1.0 inch WC, is 79.5° F., a decrease of 6.2° F. over the control.

Moreover, Table 2 shows that when embodiments of a gas pressure valve, such as the gas saver valves 100 or 300, is used in conjunction with a water heater, the decreased settings of gas pressure can allow for a cooler temperature. A cooler temperature can mean that the lifespan of the equipment, such as the diverter and the stack pipe vent, can be extended because higher heat can lead to denaturing of the material properties of the diverter and the stack pipe. The same concept applies to other components of the water heater, such as the control valve, since embodiments of a gas saver valve, such as the gas saver valves 100 or 300, can allow for cooler temperatures around the water heater. Therefore, a gas saver valve, such as the gas saver valves 100 or 300, can extend the life of the equipment by cooling the temperatures acting upon the equipment, such as the heat generating device 150, for example.

Table 3 below shows different values of quantifiable air quality properties when gas pressure is reduced using a gas saver valve, such as the gas saver valves 100 or 300, in conjunction with a furnace as the heat generating device 150. The furnace used to determine the air quality properties identified in Table 3 was a typical 80% efficient gas furnace, for example, such as can be heated with 100,000 BTUs.

TABLE 3

Natural Gas Fueled Furnace Air Quality Properties using a Gas Saver Valve

| | $O_2$ Presence % | $CO_2$ Presence % | % of Extra Air | Furnace Eff. | CO Presence | Temp of Stack Pipe | Temp of ambient air |
|---|---|---|---|---|---|---|---|
| 3.5 inch WC (control) | 6.4% | 8.2% | 39.1% | 81.9% | 18 PPM | 392° F. | 96.0° F. |
| 2.5 inch WC | 9.6% | 6.4% | 76.1% | 79.7% | 14 PPM | 392° F. | 93.6° F. |
| 2.0 inch WC | 11.6% | 5.3% | 110.4% | 78.7% | 9 PPM | 372° F. | 94.8° F. |
| 1.75 inch WC | 12.5% | 4.8% | 131.6% | 77.9% | 10 PPM | 360° F. | 89.1° F. |

TABLE 3-continued

Natural Gas Fueled Furnace Air Quality Properties using a Gas Saver Valve

|  | $O_2$ Presence % | $CO_2$ Presence % | % of Extra Air | Furnace Eff. | CO Presence | Temp of Stack Pipe | Temp of ambient air |
|---|---|---|---|---|---|---|---|
| 1.5 inch WC | 13.1% | 4.4% | 148.8% | 77.4% | 13 PPM | 352° F. | 89.1° F. |
| 1.0 inch WC | 15.3% | 3.2% | 240.9% | 74.8% | 22 PPM | 316° F. | 82.6° F. |

Table 3 shows various benefits of using embodiments of a gas saver valve, such as the gas saver valves 100 or 300, in conjunction with a furnace as the heat generating device 150. The reference pressure of the gaseous fluid, as can correspond to the gas pressure of the gaseous fluid coming outward 142 of the gas supply 140, is at a pressure of about 3.5 inch WC to about 3.75 inch WC, for example, which serves as the control for the data in Table 3, since the pressure has not been adjusted. By implementing a gas saver valve, such as the gas saver valves 100 or 300, a user can reduce the pressure of the gaseous fluid flowing into 152 and into the furnace as the heat generating device 150. In this regard, the user can lower the pressure to a range of pressures of about 1.0 inch WC to 2.5 inch WC, for example.

Referring to Table 3, when a user does not implement a gas saver valve, such as does not implement gas saver valves 100 or 300, the pressure of the gaseous fluid flowing into 152 and into the furnace as the heating generating device 150 is about 3.5 inch WC to about 3.75 inch WC, for example. The properties of the control are $O_2$ presence percentage of 6.4%, $CO_2$ presence percentage of 8.2%, percentage of additional air available for combustion is 39.1%, efficiency of the furnace is 81.9%, presence of carbon monoxide is 18 PPM, temperature of the venting stack pipe is 392° F., and the temperature of the ambient air surrounding the furnace is 96.0° F.

Continuing with reference to Table 3, when a user implements embodiments of a gas saver valve, such as the gas saver valves 100 or 300, and sets the pressure at 2.5 inch WC, the presence of $O_2$ is 9.6%, which is an increase of 3.2% over the control. At 2.0 inch WC, the presence of $O_2$ is 11.6%, which is an increase of 5.2% over the control. At 1.75 inch WC, the presence of $O_2$ is 12.5%, which is an increase of 6.1% over the control. At 1.5 inch WC, the presence of $O_2$ is 13.1%, which is an increase of 6.7% over the control. Finally, at a pressure of 1.0 inch WC, the presence of $O_2$ is 15.3%, which is an increase of 8.9% over the control. An increased oxidant presence, such as di-oxygen, can allow for a more complete combustion. A more complete combustion can allow for a cleaner flame since a complete combustion reduces the amount of black body-radiating soot. A reduced amount of soot can allow for the flame to burn cleaner, which can allow the flame to achieve a higher temperature, and thereby can make the flame more efficient.

Further, with reference to Table 3, an increasing di-oxygen presence can have a direct correlation to a decreasing carbon dioxide ($CO_2$) presence, since the increased amount of $O_2$ can lower the $CO_2$ out of the combustion reaction. The increased amount of oxidant $O_2$ and the decreased amount of $CO_2$ can be seen at the different pressure settings in Table 3. At 2.5 inch WC, the $O_2$ presence is 9.6% and the $CO_2$ presence is 6.4%. At 2.0 inch WC, the $O_2$ presence is 11.6% and the $CO_2$ presence is 5.3%. At 1.75 inch WC, the $O_2$ presence is 12.5% and the $CO_2$ presence is 4.8%. At 1.5 inch WC, the $O_2$ presence is 13.1% and the $CO_2$ presence is 4.4%. Finally, at 1.0 inch WC, the $O_2$ presence is 15.3% and the $CO_2$ presence is 3.2%. Therefore, embodiments of a gas saver valve can allow for an increased oxidant presence of $O_2$ and a decreased $CO_2$ presence, for example.

Continuing with reference to Table 3, an increased amount of air entering the burner manifold can allow for an increased presence of oxidant $O_2$. As seen in Table 3, the control provides for 39.1% additional air to enter the burner manifold which translates to 6.4% of oxidant $O_2$ to be available for combustion. When a gas saver valve, such as the gas saver valves 100 or 300, is implemented, a greater amount of air is allowed to enter the burner manifold which can provide for an increased amount of oxidant $O_2$ to allow for a more complete combustion. For example, when a gas saver valve, such as the gas saver valves 100 or 300, is set to a pressure of 2.5 inch WC, the amount of additional air entering the burner manifold is 76.1%, translating to amount of 9.6% $O_2$ available for combustion. At 2.0 inch WC, the additional air is 110.4%, which translates to 11.6% of $O_2$ available for combustion. At 1.75 inch WC, the additional air entering the burner manifold is 131.6%, which translates to 12.5% of $O_2$ available for combustion. At 1.5 inch WC, the additional air is 148.8%, which translates to 13.1% of $O_2$ available for combustion. Finally, at 1.0 inch WC, the additional air entering the burner manifold is 240.9%, a substantial increase over the control which is at 39.1%, for example, which translates to 15.3% of $O_2$ available for combustion.

Table 3 further shows how embodiments of a gas saver valve, such as the gas saver valves 100 or 300, can affect the efficiency of the furnace as the heat generating device 150. The control provides for an efficiency of 81.9%, while the decreased settings of gas pressure on a gas saver valve, such as the gas saver valves 100 or 300, appear to provide for a decreased efficiency. While this decrease in efficiency rating may, on its face, appear disadvantageous, this is not the case. The efficiency rating for a furnace indicates how much usable energy is generated and how much unusable energy is being dispelled through the stack pipe vent. For example, an 80% efficiency furnace can provide 800 British Thermal Units (BTUs) of heat for every 1000 BTUs it burns, with the remaining 200 BTUs not used and lost through the stack pipe vent. When embodiments of a gas saver valve are used and the pressure is set to a lower pressure setting than the control, a cleaner flame generally results because of the increased oxidant amount available to allow for a more complete combustion. A more complete combustion can allow for a cleaner flame, since less black body-radiating soot is produced. A cleaner flame can allow for the flame to achieve a higher temperature. If the flame is at an increased temperature, it can allow for a higher heating rate to occur at less of a gas pressure. The standard furnace is typically designed to accommodate a gas pressure of about 4.0 inch WC, for example, so as the pressure is decreased to a lesser value than 4.0 inch WC, the furnace may appear to be less efficient.

However, in reality, the furnace is actually gaining efficiency, since the reduced gas pressures can allow for a cleaner flame that burns at a higher temperature. Therefore, the efficiency rating generally may not appear to provide for an accurate assessment of the benefits of using embodiments of a gas saver valve, such as the gas saver valves 100 or 300.

Moreover, Table 3 provides other information about the change in air quality properties when using embodiments of a gas saver valve, such as the gas saver valve 100 or 300. The combustion reaction from a furnace as the heat generating device 150 generally produces carbon monoxide (CO) as a by-product, regardless of the gas pressure. The control of 3.5 inch WC produces 18 parts per million (PPM) of CO. If a gas saver valve, such as the gas saver valves 100 or 300, is implemented, at 2.5 inch WC, the CO produced is 14 PPM. At 2.0 inch WC, the CO produced is 9 PPM. At 1.75 inch WC, the CO produced is 10 PPM. At 1.5 inch WC, the CO produced is 13 PPM. Finally, at 1.0 inch WC of pressure, the CO that is produced as a by-product is 22 PPM. The guidelines set by the Occupational Safety and Health Administration (OSHA) permit up to 50 parts per million (ppm) of CO to parts of air. The National Institute for Occupational Safety and Health (NIOSH) established a recommended exposure limit for carbon monoxide of 35 ppm of CO over an 8 hour time weighted average, and 200 ppm (229 mg/m(3)) as a ceiling [NIOSH 1992]. The NIOSH standards are based on the risk of cardiovascular effects. From this data it is shown that all for except one reduced pressure setting, that the CO levels are lower than what is produced by the control without a gas saver valve, such as without the gas saver valves 100 or 300. All of the reduced vales of gas pressure settings in Table 3 meet the above mentioned safety standards of both OSHA and NIOSH. However, since the levels of CO do appear to rise when a gas saver valve, such as the gas saver valves 100 or 300, is set to 1.0 inch WC, it is desirable that a user stays within the range of adjusted gas pressure of about 1.5 inch WC to about 2.5 inch WC, for example.

Finally, Table 3 shows information about the temperatures of the stack pipe venting the unused gas and heat and the temperatures of the ambient air surrounding the furnace as the heat generating device 150. When a gas saver valve, such as the gas saver valves 100 or 300, is not implemented, the control provides a stack pipe temperature of 392° F. and an ambient surrounding air temperature of the furnace at 96.0° F. When a gas saver valve, such as the gas saver valves 100 or 300, is used, for example, and when the pressure is set at 2.5 inch WC, the temperature of the stack pipe is 392° F. and the temperature of the ambient air surrounding the furnace is 93.6° F., a decrease of 2.4° F. from the control. At 2.0 inch WC, the temperature of the stack pipe is 372° F., a decrease of 20° F. from the control. The temperature of the ambient air surrounding the furnace, when the gas pressure is at 2.0 inch WC, is 94.8° F., a decrease of 1.2° F. over the control. At 1.75 inch WC, the temperature of the stack pipe is 360° F., a decrease of 32° F. from the control. The temperature of the ambient air surrounding the furnace, when the gas pressure is at 1.75 inch WC, is 89.1° F., a decrease of 6.9° F. over the control. At 1.5 inch WC, the temperature of the stack pipe is 352° F., a decrease of 40° F. over the control. The temperature of the ambient air surrounding the furnace, when the gas pressure is at 1.5 inch WC, is 89.1° F., a decrease of 6.9° F. over the control. Finally, at a gas pressure of 1.0 inch WC, the temperature of the stack pipe is 316° F., a decrease of 76° F. over the control. The temperature of the ambient air surrounding the water heater, when the gas pressure is at 1.0 inch WC, is 82.6° F., a decrease of 13.4° F. over the control.

Therefore, Table 3 indicates that when embodiments of a gas saver valve, such as the gas saver valves 100 or 300, is used in conjunction with a furnace as the heat generating device 150 that the decreased settings of gas pressure can allow for a cooler temperature. A cooler temperature can extend the lifespan of the equipment associated with a furnace, such as the diverter and the stack pipe vent, because higher heat can lead to denaturing of the material properties of the diverter and the stack pipe. The same concept can apply to other components of the furnace, such as the control valve, since embodiments of a gas saver valve, such as the gas saver valves 100 or 300, can allow for cooler temperatures around the furnace. Therefore, embodiments of a gas saver valve, such as the gas saver valves 100 or 300, can extend the life of the equipment associated with various heat generating devices 150 by providing relatively cooler temperatures acting upon the equipment, for example.

Referring to Table 4, details of various heat properties, such as a flow rate, a heat rate, and a heat energy produced, when a gas pressure of a gaseous fluid is reduced using embodiments of a gas saver valve, such as the gas saver valves 100 or 300, in conjunction with a furnace as the heat generating device 150. Again, the furnace used to determine the heat properties identified in Table 4 was a typical 80% efficient gas furnace, for example, such as can be heated with 100,000 BTUs.

TABLE 4

Natural Gas Fueled Furnace Heat Properties using a Gas Saver Valve

| | Flow rate (cf/min) | Heat Rate (BTU/min) | Flow rate (cf/hr) | Heat Rate (BTU/hr) | Heat Energy (therms) | Furnace Exhaust Temp | Furnace Supply Temp |
|---|---|---|---|---|---|---|---|
| 3.5 in WC (control) | 1.649 | 1,662.192 | 98.94 | 99,731.52 | 0.99732 | 440° F. | 160° F. |
| 2.5 inch WC | 1.407 | 1,418.256 | 84.42 | 85,095.36 | 0.85095 | 409° F. | 147° F. |
| 2.0 in WC | 1.236 | 1,245.888 | 74.16 | 74,753.28 | 0.74753 | 382° F. | 134° F. |
| 1.75 in WC | 1.14 | 1,149.120 | 68.40 | 68,947.20 | 0.68947 | 364° F. | 126° F. |
| 1.5 in WC | 1.019 | 1,027.152 | 61.14 | 61,629.12 | 0.61629 | 350° F. | 124° F. |
| 1.0 in WC | 0.873 | 879.984 | 52.38 | 52,799.04 | 0.52799 | 314° F. | 118° F. |

The heat properties identified in Table 4 show various benefits of using embodiments of a gas saver valve, such as the gas saver valves 100 or 300, in conjunction with a furnace as heat generating device 150. The reference pressure of the gaseous fluid, as can correspond to the gas pressure of the gaseous fluid coming outward 142 of the gas supply 140, is at a pressure of about 3.5 inch WC to about 3.75 inch WC, for example, which serves as the control for the data in Table 4, since the pressure has not been adjusted. By implementing a gas saver valve, such as the gas saver valves 100 or 300, a user can reduce the pressure of the gaseous fluid flowing into 152 and into the furnace as the heat generating device 150. Using embodiments of a gas saver valve, such as the gas saver valves 100 or 300, the user can lower the gas pressure to a range of pressures of about 1.0 inch WC to about 2.5 inch WC, for example, and enable generating a temperature in an operational range of the furnace, as the heat generating device 150, and thereby desirably reduce the gas usage for the furnace.

Referring to Table 4, when a user does not implement a gas saver valve, such as does not implement the gas saver valves 100 or 300, the pressure of the gaseous fluid flowing into 152 and into the furnace as the heating generating device 150 is about 3.5 inch WC to about 3.75 inch WC, for example. The properties of the control were measured to be at a flow rate of 1.649 cubic feet per minute (cf/min). Based off of this measured flow rate, the remaining heat properties can be calculated. To calculate the heat rate in British Thermal Units per minute (BTU/min) off of the flow rate, when the flow rate is in units of cf/min, multiply the flow rate by the conversion unit 1,008.00, since 1 cf/min=1,008.00 BTU/min, Therefore, for a flow rate of 1.649 cf/min, the heat rate will be 1,662.192 BTU/min. To convert the flow rate from cf/min to cubic feet per hour (cf/hr), multiply the flow rate by 60, since 60 minutes=1 hr. Therefore, a flow rate of 1.649 cf/min will equal 98.94 cf/hr. To arrive at the heat rate in BTU/hr, then multiply the flow rate in cf/hr by the number 1,008.00 BTU/min. Therefore, if the flow rate is 98.94 cf/hr, then the heat rate will be 99,731.52 BTU/hr. Finally, to arrive at a property of heat energy, designated in thermal units (therm), the heat rate is divided in units of BTU/hr by 100,000 since 1 therm=100,000 BTUs. Therefore, if the heat rate is 99,731.52 BTU/hr, then the heat energy generated will be 0.99732 therms. Also, as indicated in Table 4, the temperature of the unused air exhausting out of the vent is measured at 440° F., while the temperature of the air that is supplied from the furnace through the dwelling corresponds to a measured value of 160° F., for example.

Table 4 shows the benefits of using a gas saver valve, such as the gas saver valves 100 or 300, in conjunction with a furnace heat as the generating device 150. If the gas pressure of the gaseous fluid is reduced to 2.5 inch WC, then the measured flow rate is 1.407 cf/min, or 84.42 cf/hr. The heat rate for this level of gas pressure will be 1,418.256 BTU/min, or 85,095.36 BTU/hr. Therefore, the heat energy generated from a gas pressure of 2.5 inch WC will be 0.85095 therms. The temperature of the unused air exhausting out of the vent from the furnace is measured at 409° F., while the temperature of the air that is supplied from the furnace through the dwelling corresponds to a measured value of 147° F.

Continuing with reference to Table 4, if the pressure is set to 2.0 inch WC, the flow rate is measured at 1.236 cf/min, or 74.16 cf/hr. The heat rate for this level of gas pressure is 1,245.888 BTU/min, or 74,753.28 BTU/hr. Therefore, the heat energy generated from a gas pressure of 2.0 inch WC will be 0.74753 therms. The temperature of the unused air exhausting out of the vent from the furnace is measured at 382° F., while the temperature of the air that is supplied from the furnace through the dwelling corresponds to a measured value of 134° F.

Also, in Table 4, if the pressure is set to 1.75 inch WC, the flow rate is measured at 1.14 cf/min, or 68.40 cf/hr. The heat rate is 1,149.120 BTU/min, or 68,947.20 BTU/hr. Therefore the heat energy generated from a gas pressure of 1.75 inch WC will be 0.68947 therms. The temperature of the unused air exhausting out of the vent from the furnace is measured at 364° F., while the temperature of the air that is supplied from the furnace through the dwelling corresponds to a measured value of 126° F.

Further, from Table 4, if the pressure is set to 1.5 inch WC, the flow rate is measured at 1.019 cf/min, or 61.14 cf/hr. The heat rate is 1,027.152 BTU/min, or 61,629.12 BTU/hr. Therefore the heat energy generated from a gas pressure of 1.5 inch WC will be 0.61629 therms. The temperature of the unused air exhausting out of the vent from the furnace is measured at 350° F., while the temperature of the air that is supplied from the furnace through the dwelling corresponds to a measured value of 124° F.

As also shown in Table 4, if the gas pressure is set to 1.0 inch WC, the flow rate is measured at 0.873 cf/min, or 52.38 cf/hr. The heat rate is 879.984 BTU/min, or 52,799.04 BTU/hr. Therefore the heat energy generated from a gas pressure of 1.0 inch WC will be 0.52799 therms. The temperature of the unused air exhausting out of the vent from the furnace is measured at 314° F., while the temperature of the air that is supplied from the furnace through the dwelling corresponds to a measured value of 118° F.

Table 4 shows that by implementing embodiments of a gas saver valve, such as the gas saver valves 100 or 300, that the amount of heat generated can be reduced, but the temperature generated by the furnace as the heat generating device 150 can still be in an operational range of the furnace, for example. Reducing the amount heat energy can reduce the amount of heat that is lost through the exhaust from the furnace. For example, by reducing the gas pressure down to 2.5 inch WC, the temperature of the air exhausting from the furnace is 409° F., a reduction of 31° F. from the control. Also, less heat is being lost through exhausting through the chimney by reducing the pressure of the gas flowing into 152 and into the furnace as the heat generating device 150. This reduction in temperature can also reduce the harm caused by excessive heat on the vent of the furnace, for example.

Another benefit of generating less heat energy is that it can allow for the heat exchanger located within the furnace to operate at a cooler temperature. By operating the heat exchanger at a cooler temperature, the heat exchanger can experience less thermal shock and less fatigue. This can expand the life of the heat exchanger. Further, if the heat exchanger is cooler, it can cause the furnace to run longer. If the furnace runs longer, then the blower inside the furnace will run longer, as well. By having the blower run longer, the air inside the dwelling will continue to circulate, thereby increasing air circulation. Increased air circulation can not only improve comfort, but can also help asthma and allergy sufferers, since increased circulation can help remove airborne dust particles, such as by being removed by a filter associated with the furnace, for example. Finally, if the furnace runs longer, a humidifier associated with the furnace can likewise also run longer. By increasing the time span the humidifier operates, the moistness of the air can increase, which can help with breathing and can reduce the risk airborne infections.

It is to be understood that the present invention is not limited to the embodiments described above, but encompasses any and all embodiments within the scope of the following claims.

We claim:

1. A gas saver valve, consisting of:
   a valve body;
   a regulator, the regulator positioned within the valve body to adjust a gas pressure of a gaseous fluid to flow through the valve body;
   a control member to adjust the regulator to selectively control the gas pressure of the gaseous fluid to flow through the valve body, the control member consisting of first and second spaced apart abutments to prevent the control member from being rotated past predetermined positions and a plurality of marked settings calibrated to correspond to a value of the gas pressure disposed between the first and second abutments, wherein the marked settings include a designation for a fully open setting at the first abutment to allow the gaseous fluid unrestricted flow through the valve body and a fully closed setting at the spaced apart second abutment to prohibit the gaseous fluid to flow through the valve body, the marked settings corresponding to an amount of gas pressure to adjust the gas pressure of the gaseous fluid to a selected calibrated value in a range of gas pressure less than a reference gas pressure in operating a heat generating device, wherein the reference gas pressure is in a range of about 3.75 inch Water Column (WC) to about 3.5 inch Water Column (WC), further wherein the marked settings are designated from the closed to open setting in consecutive gas pressures of 1.0 inch WC, 1.5 inch WC, 1.75 inch WC, 2.0 inch WC, and 2.5 inch WC; and
   an indicator to indicate a selected gas pressure to flow through the valve body when the indicator corresponds to a selected marked setting of the control member, wherein the indicator is positioned on the valve body.

2. A method for regulating flow of a gaseous fluid, comprising the steps of:
   placing a gas saver valve in communication with a supply of a gaseous fluid and a heat generating device, the gas saver valve including a regulator to adjust a gas pressure of the gaseous fluid and a control member calibrated with a plurality of marked settings each corresponding to a value of the gas pressure, wherein the control member consists of:
   i) first and second spaced apart abutments to prevent the control member from being rotated past predetermined positions;
   ii) the marked settings include a designation for a fully open setting at the first abutment to allow the gaseous fluid unrestricted flow through the valve body and a fully closed setting at the spaced apart second abutment to prohibit the gaseous fluid to flow through the valve body, the marked settings corresponding to an amount of gas pressure to adjust the gas pressure of the gaseous fluid to a selected calibrated value in a range of gas pressure less than a reference gas pressure in operating the heat generating device, wherein the reference gas pressure is in a range of about 3.75 inch Water Column (WC) to about 3.5 inch Water Column (WC), further wherein the marked settings are designated from the closed to open setting in consecutive gas pressures of 1.0 inch WC, 1.5 inch WC, 1.75 inch WC, 2.0 inch WC, and 2.5 inch WC;
   selecting the gas pressure to flow through the regulator by adjusting the control member to the selected calibrated value of the plurality of marked settings, the reference, the reference gas pressure and the range of gas pressure generating a temperature in an operational range of the heat generating device;
   indicating by an indicator the selected calibrated value of the gas pressure to flow through the regulator corresponding to the calibrated marked setting of the control member; and
   adjusting the gas pressure of the gaseous fluid by the regulator to the selected calibrated value as indicated by the indicator in the range of gas pressure less than the reference gas pressure in operating the heat generating device.

3. The method for regulating flow of a gaseous fluid according to claim 2, wherein the heat generating device is a furnace.

4. The method for regulating flow of a gaseous fluid according to claim 2, wherein the heat generating device is a water heater.

5. The method for regulating flow of a gaseous fluid according to claim 2, wherein the gaseous fluid is natural gas.

* * * * *